April 5, 1938.  J. HARRINGTON  2,113,321
CENTRIFUGAL FILTRATION DEVICE
Filed March 23, 1936   2 Sheets-Sheet 1
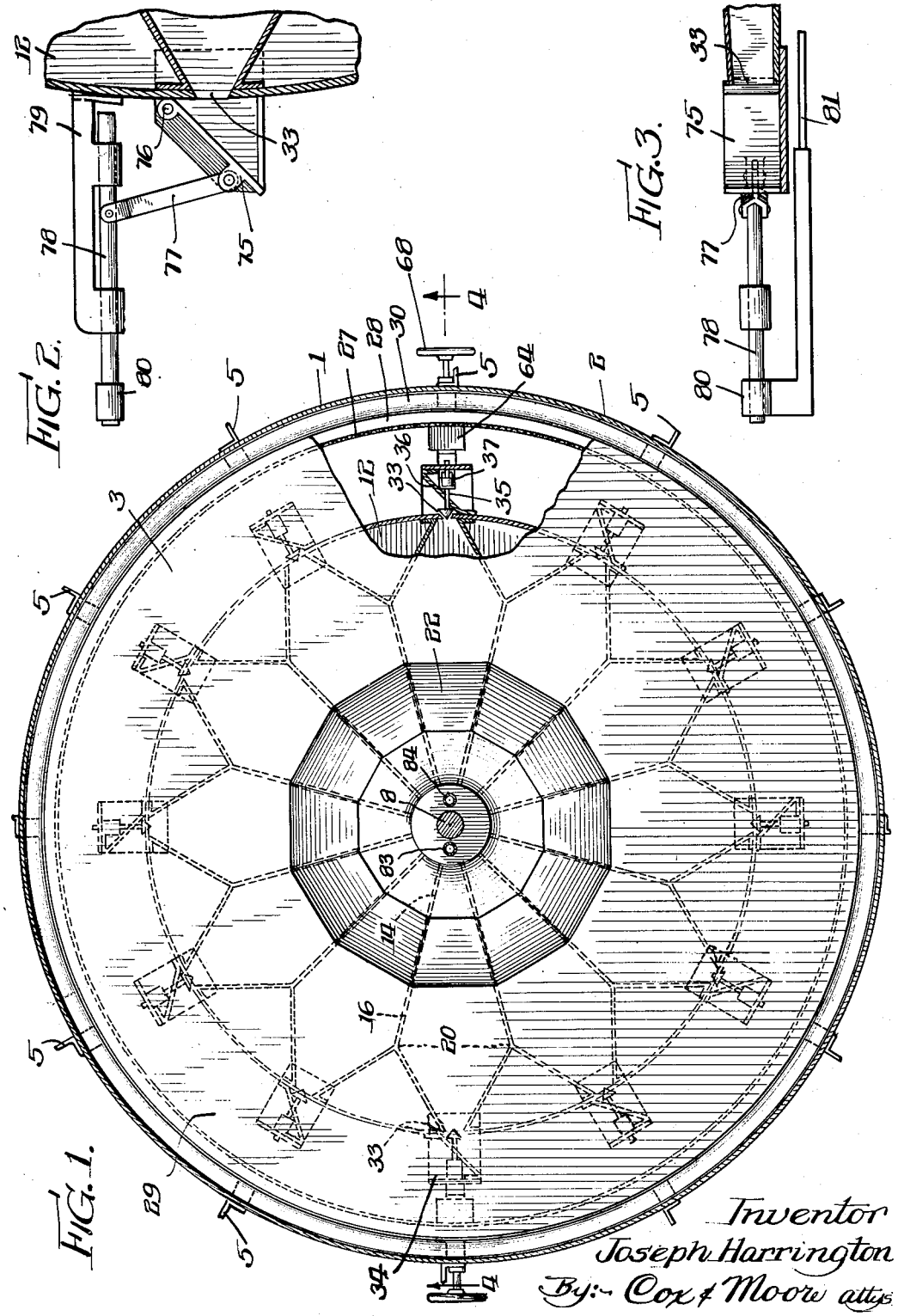
Inventor
Joseph Harrington
By:- Cox & Moore attys

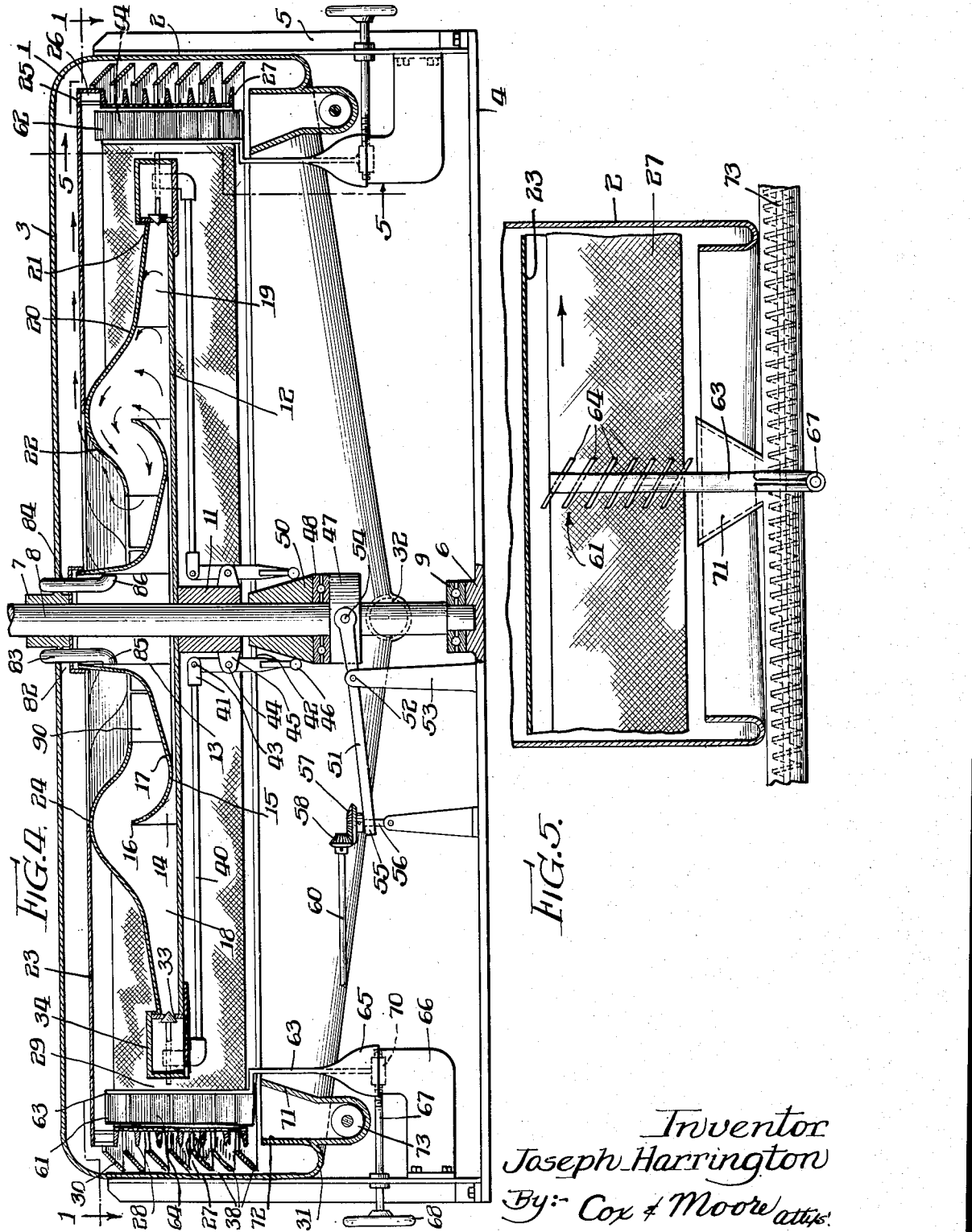

Patented Apr. 5, 1938

2,113,321

UNITED STATES PATENT OFFICE 2,113,321

CENTRIFUGAL FILTRATION DEVICE

Joseph Harrington, Riverside, Ill.

Application March 23, 1936, Serial No. 70,490

11 Claims. (Cl. 210—63)

The invention relates in general to a centrifugal filtration device, and more particularly to a device adapted to separate out the solid portions from a fluid carrying solid particles in suspension, wherein the particles are of almost colloidal size.

One of the important problems in present-day industrial process work involves the handling of liquids containing solids. Such solid-liquid compositions, or "dispersed systems", as they are called, vary in nature and characteristics particularly with respect to the size and dispersion of the particles of solid matter carried in the liquid.

On the one hand there are the mechanical mixtures in which the solid particles are of comparatively large size. Next in order are the suspensions in which the solid particles are of somewhat smaller size than that in the case of the mere mechanical mixture. Next in order are the colloids in which the particle size is still smaller. The solid-liquid compositions in which the particle size is of molecular order, of course, are termed true solutions.

The line of demarcation between suspensions and colloids is usually set on the basis of particle size. The smallest particle which can be observed directly under the microscope is of the order of 0.1 mu. This conception of the continuity of "dispersed systems" from mechanical suspensions at the one extreme, to true solutions at the other, finds its justification in the graded character of the physical properties of the three groups, as evidenced, for example, by observations on diffusion and filtration and by osmotic, optical and electrical experiments. It is this gradation in physical characteristics which introduces serious difficulty in process work.

It is usually necessary to effect some separation of the solids from the liquids in the course of process work. Where the particles are comparatively large this separation may be readily effected by gravity settling. Where the particle size is of colloidal order, it is very difficult to effect any separation by mere mechanical means, and finally where the particle size is of the order of the true solution physio-chemical and chemical means must be employed.

It has been found, however, that there are a large number of suspensions in which the particle size ranged from 1.0 mu to 0.1 mu in which ordinary gravity settling and filtration operations are extremely unsatisfactory, slow, and expensive. It is an object therefore of the present invention to provide a method and apparatus for separating the solids out of suspensions in this sub-micronic zone.

It is another object of the present invention to provide a method and apparatus for the separation of solids from liquids in a continuous, speedy, and economical operation. It is also an object of this invention to provide a method and apparatus for the separation of solids out of suspension by the employment of centrifugal force.

It is also an object of the present invention to impose various different centrifugal forces upon a suspension of solid material in a fluid in a continuous succession whereby to provide an eventual complete separation of the solid material out of the fluid medium. It is also desired by the present invention to provide apparatus for accomplishing this result.

It is an additional object of this invention to provide a method and apparatus for breaking down a suspension containing solid material into a more concentrated suspension and subsequently separating the solid material out of the more concentrated suspension.

It is moreover an object of the present invention to provide a method and apparatus whereby a suspension containing solid matter may be broken down and a clear portion of the suspensive medium separated therefrom, the clear portion being continuously moved backwardly in a general direction toward the point of origin.

It is an additional object of the present invention to provide a series of rotatable chambers in which a suspension containing solid matter may be treated in such a manner that the suspension is continuously broken down into a more concentrated suspension portion and a clear suspensive medium portion, the clear suspensive medium portion being continuously moved away from the more concentrated portion in a counter-current flow system.

Numerous other objects and advantages will become apparent during the progress of the following specification.

Fig. 1 is a cross sectional plan view of one preferred embodiment of the present invention about line 1—1 of Fig. 4.

Fig. 2 is a detail view of an alternative form of delivery orifice which may be used in conjunction with the embodiment shown in Fig. 1.

Fig. 3 is an elevation view of the delivery orifice shown in Fig. 2.

Fig. 4 is a cross section view of the embodiment shown in Fig. 1 about 4—4 of Fig. 1.

Fig. 5 is a cross section view of the embodiment shown in Figs. 1 and 4 about line 5—5 of Fig. 4.

The method involved in the present invention broadly consists in exerting a progression of varying centrifugal forces upon a suspension whereby the suspension is broken down into a sludge and supernatant clear liquid under the influence of one centrifugal force, the sludge being subsequently exerted to an additional centrifugal force which separates out of it the solid material therein, the clear liquid being in turn impelled by another centrifugal force which continuously removes it from the point of sludge separation.

The preferred method of practicing this invention comprises flowing the suspension into a rotating intake chamber, in which chamber the sludge is acted upon by a comparatively low centrifugal force. The suspension is then impelled outwardly from the intake chamber through a restricted orifice into the bottom of a rotating separation chamber. At this point the suspension is acted upon by an increased centrifugal force, whereupon it separates or stratifies into a sludge and a comparatively clear liquid.

The sludge is then impelled outwardly under the influence of increasing centrifugal force while the clear liquid lags behind. The clear liquid lagging behind is exposed to a centrifugal force of lesser magnitude than the centrifugal force to which the suspension is exposed at the orifice of the intake chamber and is permitted to be impelled freely out of the separation chamber toward a suitable disposal outlet under the influence of this centrifugal force. Thus the sludge is impelled away from the point of separation or stratification along one path under the influence of a predetermined increasing centrifugal force, while the clear liquid is impelled away from the point of separation and stratification along a different path and under the influence of a different centrifugal force.

The sludge is then impacted against a suitable filtration medium and there exposed to a further force which causes the complete separation of the liquid from the solid particles in the sludge, leaving the solid particles on the filter medium and causing the liquid to pass through the filter medium to a suitable disposal outlet.

In practicing the present invention it has been found preferable to effect this final separation by exposing the sludge, which has been impacted on the filter medium, to a comparatively high centrifugal force which tends to drive the sludge against the filter medium. The filter medium restrains the solid particles in the sludge and allows only the liquid portion thereof to pass through under the impulse of this centrifugal force. It is conceivable, of course, that other forces, such as pressure, might be exerted upon the sludge at this point in the process whereby to effect the final separation described.

It is well known that even the most efficient filtration media do not restrain all the solid particles out of the suspension being forced therethrough. Maximum efficiency is only reached after a proper thickness of so-called filter-cake is built up on the surface thereof. On the other hand, if the filter-cake is allowed to become too thick, the filtration efficiency is seriously impaired. Thus the final step in the present process consists in continuously removing a top layer of the cake formed on the filter medium and progressively advancing the removed material across the surface of the filter medium and thence to a suitable disposal outlet.

A preferred form of apparatus for carrying out this process as shown in the drawings, comprises an outer rigid housing 1, which has a vertical side 2. The housing has a top 3. This housing is rigidly fastened to a suitable rigid base 4 by a plurality of vertical members 5. A centrally located bearing member 6 is supported in the base 4.

A bearing 7 is located centrally of the top member 3 of the housing 1. This bearing 7 is located in such a position as to be perpendicularly above the bearing member 6. The main shaft 8 passes through the bearing member 7 downwardly into the interior of the housing and is supported on the bearing member 6 through the medium of a disc roller bearing 9. The main shaft 8 is connected above the bearing 7 to a conventional source of driving power (not shown).

A sleeve 11 is rigidly mounted on the shaft intermediate between the bearing members 6 and 7. The sleeve 11 carries a large circular disc 12. The disc 12 is adapted to rotate with the shaft in a plane parallel to the base of the apparatus.

A plurality of radially disposed intake chambers 13 are formed on the top of the disc 12 contiguous to the center thereof by a plurality of vertically upstanding fins 14 mounted rigidly on the disc 12. These fins 14 have a curved top contour line which is peaked upwardly away from the disc at a point near the center thereof, and slopes downwardly and outwardly away from the center and top of the device to a point 15, at which point this contour line curves upwardly again and terminates at a point 16.

A circular pressed steel disc 17 having a cross section complementary to the contour lines of the fins is placed downwardly over the fins forming a cover therefor, and is rigidly mounted thereon, thereby completing the top of the intake chambers.

A plurality of separation chambers 18 are formed on top of the disc by a plurality of partitions 19. These partitions 19 have a top contour line substantially as shown in Fig. 4, sloping upwardly from a point near the center of the device to a point above the point 16 of the fins 14, and then sloping downwardly and outwardly away from the center to a point 20, at which point the contour flattens out and slopes gradually outwardly to the outward end 21 of the partition 19.

A pressed steel circular cover member 22 is rigidly mounted on top of the partitions and has a cross section complementary to the contour lines of the partitions so as to form a complete top for the separation chambers.

A circular plate 23 is rigidly mounted on the cover member 22 and is adapted to rotate with the shaft and disc 12 in a plane horizontal to the base. This plate 23 terminates in a circular opening at 24 toward the center of the device and extends outwardly to a point 25 which is a substantial distance inside the casing, allowing for an annular space between the outer circumference 23 and the housing 1. An annular rim-like support member 26 is rigidly fixed around the outer periphery of this disc 23.

A foraminous rigid screen 27 is mounted on the bottom of the support member 26. This screen may be of any suitable width and forms a cylindrical band adapted to rotate with the shaft 8. A plurality of annular horizontal rings 28 are mounted along the screen at spaced intervals to deflect the liquid passing therethrough outwardly to the outer casing.

A plurality of angularly disposed baffle rings 30 are mounted rigidly on the housing at spaced intervals a small distance away from the housing. The baffle rings 30 are adapted to catch the liquid passing through the screen and deflect it downwardly along the inner surface of the housing.

A sloping trough 31 is formed in the bottom edge of the housing. This trough 31 is adapted to catch the liquid flowing downwardly along the inside of the housing 1 and over the baffle rings 30 and carry such liquid out through the outlet pipe 32.

The diameter of the disc 12 is considerably smaller than the diameter of the screen, allowing for a substantial free space 29 between the periphery of the disc 12 and the screen member 27. The fins 14 and the partitions 16, respectively, extend radially outwardly from the center of the disc to the point 20, whereupon they extend angularly inwardly toward the center of the chamber and outwardly toward the edge of the disc. A circular orifice 33 is provided at the outer end of the separation chamber. A valve support member 34 is rigidly mounted on the disc adjacent to the chamber orifice 33. This support carries a sliding rod on the end of which is a conical valve member 35 adapted to be seated in the circular orifice 33.

An angularly disposed deflection plate 36 is associated with each valve member so that the material passing through the orifice strikes the plate 36 and is directed angularly thereby against the screen.

The valve members 35 are slidingly mounted in a suitable support member 37 of conventional design, so that they may slide horizontally toward and away from the orifice opening 33. A vertical arm 38 is rigidly fixed to the valve member 35 and passes downwardly substantially below the plane of the disc 12, and is rigidly attached to a rod 40 which extends radially inwardly from the arm 38 and terminates in a yoke 41, which is rotatably attached to a control arm 42 by a pin 43 passing through the yoke and control arm.

The control arm is pivoted about a pin 44 which passes through a fulcrum member 45 rigidly mounted on the fixed sleeve 11. This control arm 42 extends downwardly below the fulcrum and terminates in a roller bearing member 46.

A slidable collar 47 is mounted on the shaft. Above the collar is a disc ball bearing member 48 mounted around the shaft 8. Above this is a slidable sleeve 50 which has a conical outer surface. The larger diameter of this conical sleeve 50 is adjacent the ball bearing disc 48. The smaller diameter thereof is located at the upper end thereof near the rigidly mounted sleeve 11.

The collar and cone-shaped sleeve assembly is adapted to slide freely up and down on the shaft 8. The control arm roller bearing 46 rides along the surface of the cone-shaped sleeve 50 as the shaft rotates, and turns with the disc and screen assembly. The centrifugal force directed against the valve assembly at 33 tends to force the valve outwardly. This rotates the arm 42 about the fulcrum pin 44 and tends to force the roller bearing member 46 thereof inwardly toward the center of the shaft.

As the conical sleeve is moved upwardly or downwardly of the shaft the displacement of the roller bearing 46 radially away from the center of the shaft is varied. Thus the valve may be opened or closed during rotation of the machine. It is also possible at this point to interpose a suitable spring of conventional design to force the control arm into rolling engagement with the conical sleeve, although it has been found that the normal centrifugal force of the machine accomplishes this purpose satisfactorily.

The collar 47 is moved upwardly and downwardly along the shaft by the yoke member 51, which is pivoted about a pin 52 mounted in a suitable fulcrum member 53. The fulcrum member 53 is rigidly fixed on the base of the machine. The yoke 51 may be affixed to the collar 47 by a suitable pin bearing assembly 54.

The other extremity of the yoke 51 is provided with a hole 55 through which passes a threaded shaft. The hole 55 threadedly engages the shaft 56 and is moved upwardly and downwardly as the threaded shaft is turned. At one end of this threaded shaft is a bevel gear 57 which meshes with a second bevel gear 58. The bevel gear 58 is mounted on a rod 60 which extends through rigid bearings of conventional pattern (not shown) to the outer housing of the machine, whereby any suitable conventional form of handle for turning it may be used.

As the bevel gear 58 turns it rotates the bevel gear 57, which turns the threaded shaft and causes the yoke member 51 to move upwardly and downwardly along the threaded shaft. This in turn causes the collar affixed to the other end of the yoke to move upwardly and downwardly along the shaft.

The valve support member 34 does not entirely span the free space 29 between the periphery of the disc 12 and the inside of the screen 27. This allows room for the mounting of scraper arms. Any desired number of scraper arms may be used. In the embodiment shown in the drawings two diametrically opposite scraper arms 61 and 62 are employed.

These scraper arms are composed of a vertical support member 63, along the length of which is mounted a plurality of angularly disposed scraper vanes 64. The arrangement of this scraper arm with its vanes is more clearly shown in Fig. 5. It should be noted that the bottom edge of each scraper vane is somewhat lower than the top end of the next adjacent scraper vane.

The scraper supporting member 63 extends downwardly below the trough-like edge of the housing 1 and terminates in a sliding base member 65. A scraper base 66 is rigidly mounted against the side of the housing and is adapted to allow the base portion 65 to slide horizontally over its surface.

A lead screw 67 is operably mounted in the side of the casing and actuated by a suitable handle 68. The lead screw engages a threaded member 70 on the scraper supporting arm base 65, whereby to move the scraper assembly radially inwardly and outwardly through a small limit of motion so as to adjust the relative distance of the scraper vanes from the screen, to allow for more or less complete scraping of the screen as may be desired in any given instance.

Directly beneath the scraper vanes is a hopper 71 which may be integrally formed in the housing 1. This hopper extends down below the edge of the trough at the bottom of the casing and is separated from this trough by a wall 72. At the bottom of the hopper is located a screw conveyor 73 which passes therethrough and is adapted to carry the material falling down into the hopper out to any suitable disposal system.

It may be desirable to vary the angle of deflection at the orifice of the separation chamber. This may be accomplished as shown in Figs. 2 and 3 by providing a gate member 75 which is rotatable about a suitable bearing 76 and is actuated by an arm 77. The arm 77 is in turn actuated by a rod 78. The rod 78 is mounted in a bracket 79 which is in turn rigidly mounted on the periphery of the disc 12. This rod 78 is attached to an arm 80 which extends vertically downward and connects to a rod 81 which is similar in all respects to the rod 40, previously described and is actuated radially inwardly and outwardly in the same manner to allow for the opening and shutting of the gate member 75. This gate member may then be used initially as a valve and subsequently as a deflection plate having variable angles of deflection.

Associated with the bearing 7 is a rigid collar 82 which acts as a sort of cover for the inside top opening of the intake chambers. Through this collar any suitable number of intake pipes may be placed. In the embodiment shown two such intake pipes 83 and 84, respectively, have been utilized. These intake pipes are connected to a suitable source of supply for the suspension which is to be treated and are bent slightly outwardly as shown at 85 and 86, respectively, to discharge the fluid against the top into the intake chambers.

The present invention may be used with any number of different types of liquid suspensions. It has been found particularly applicable to suspensions of pulverized coal, for instance. The operation of the device therefore may well be described in connection with the separation of such suspensions.

In purifying coal to make a highly concentrated, purely carbonaceous fuel therefrom, the coal is finely pulverized and suspended in water. In order to effect a proper purification of this substance it has been found desirable to pulverize it to a very high degree of fineness. The suspension therefore is one that is extremely difficult to filter or separate out.

This liquid suspension is fed into the apparatus described through the intake pipes 85 and 86. The shaft is driven at a fairly high rate of speed. Of course during the initial operation of the machine the chamber must be fairly well filled and the maximum speed attained. It is therefore desirable to maintain the valves 35 in closed position until the machine has reached operative condition. During this period the suspension flows into the intake chamber and downwardly therethrough, passing the constricted portion 15.

By reason of the rotation of the disc 12, centrifugal force is exerted upon the liquid suspension in the intake chamber, and it moves outwardly past the restricted point 15 thereof and into the separation chamber. There is a certain amount of back pressure exerted against the liquid suspension in the intake chamber. As it passes this restricted point this back pressure is released. Due to a combination effect of this release of back pressure, and the increasing centrifugal force imparted to the solution as it moves outwardly along the disc, a separation takes place in the enlarged portion of the separation chamber.

Thus the liquid suspension breaks down into clear liquid medium and a sort of sludge, which is in effect a highly concentrated suspension of the pulverized coal in a limited quantity of the liquid medium. This sludge is much heavier than the liquid medium and naturally moves outward through the separation chamber at a much greater rate, due to centrifugal force, than does the liquid medium.

The liquid medium is forced upwardly to the top of the separation chamber in the area of the highest point 24 thereof. At this point it is acted upon in part by centripetal force and also by the displacing effect of the continued separation taking place in the lower portion of the separation chamber, so that it moves backwardly toward the shaft and down over the top of the intake chamber and into the area 90.

At this point it is again exposed to the centrifugal force of the rotating disc and the rotating top of the intake chamber, whereupon it tends to move outwardly and upwardly over the curved outside of the top of the separation chamber and onto the horizontal top surface of the top disc 23. There it is forced outwardly in a fairly rapidly moving thin sheet across the top of the disc 23 by the centrifugal force imparted to it, and is delivered off of the outer edge of the disc 23 against the housing 1 where it falls downwardly against the series of vanes 30, and flows thence into the trough 31 and out through the outlet pipe 32.

The sludge in the separation chamber meanwhile moves outwardly, impelled by centrifugal force past the point 20 in the separation chamber, at which the separation chamber begins to narrow down. The sludge then passes forwardly toward the orifice 33. As it moves outwardly it acquires a more rapid circular motion and therefore greater centrifugal force is exerted upon it. This causes a continued separation whereby the sludge becomes thicker and more dense and the separated clear liquid is displaced backwardly along the upwardly sloping top side of this portion of the separation chamber to join with the previously separated clear liquid medium. Thus the highly concentrated sludge passes up to the orifice 33.

As the machine reaches operative speed and condition the valve 35 is opened, whereupon the highly concentrated sludge is hurled outwardly against the deflector vane and directed thereby against the surface of the screen 27. The conical shape of the valve 35 and the action of the deflector vane combine to cause the thickened sludge to spread over the surface of the screen in a fairly uniform manner. As the concentrated sludge is deposited on the screen it reaches its greatest circular speed.

At this point the centrifugal force exerted upon it tends to force it through the screen. However, the screen is perforated with very fine openings which tend to retain the solid matter in the concentrated sludge, while the freely moving liquid medium passes through the screen and is hurled outwardly against the vanes 30 and thence downwardly into the trough 31.

This tends to build up a deposit of solid coal particles on the surface of the screen. This deposit in turn acts as a filter cake and operates to cause complete separation of the sludge deposited thereupon.

Meanwhile the scraper mechanism has been set at a distance substantially away from the surface of the screen to allow for building up this cake deposit on the surface of the screen. As the cake deposit is built up to a satisfactory condition the scraper mechanism is moved closer to the screen and begins to scrape off the top portion of the cake continuously. This scraped-off portion advances downwardly along each scraper vane in turn and is caught on its next half revolution by the next adjacent scraper vane and advanced a step further. The scraper vanes, as was previously pointed out, overlap slightly so that the excess delivered off the tail of one scraper vane is completely caught and deflected by the next adjacent scraper vane. Thus the separated solid material is advanced downwardly along the surface of the screen.

It should be noted that the tendency of the particles scraped off the surface of the cake on the screen by reason of the centrifugal force exerted upon them is not only downwardly but toward the screen, so that, during each successive advancement downwardly from one scraper vane to the next, it is again exposed to the centrifugal action on the surface of the screen so that any slight amount of liquid medium still retained by the cake will be continuously forced outwardly. Thus when the scraped material arrives at the bottom scraper vane it is entirely free of liquid medium and will drop downwardly into the hopper 71 where it is caught by the screw conveyor 73 and transferred out of the machine to a suitable point of disposal.

The annular deflection rings 28 around the outside of the screen serve to lend physical strength to the screen and also to prevent any possible downward deflection of the liquid medium passing therethrough, thus assuring that none of the liquid medium passing through the screen will drop down along the surface thereof and be commingled with the separated solid material in the hopper.

The embodiment above described has been characterized as having a foraminous screen. It will be apparent that this screen may also be covered on the inside with a fine wire mesh or it may be surfaced with a suitable filter cloth if the liquid suspension to be treated is very difficult to separate.

It will also be apparent that the size of the perforations in the foraminous screen may be varied, depending upon the type of liquid suspension to be treated. Similarly the speed of rotation of the discs may be varied. If the liquid suspension to be handled is very difficult to separate a high speed of rotation of the discs may be used in combination with a restricted amount of opening in the valve 35. If the liquid suspension is fairly readily separable a lower speed may be used, or, on the other hand, if it is desirable to obtain the highest output possible the maximum speed and maximum valve opening at the orifice may be employed simultaneously.

It has also been found that the curves and relative proportions of the intake and separation chambers may be varied somewhat to accommodate different types of liquid suspensions. Thus where the liquid suspension contains a high percentage of liquid medium, the proportion between the greatest and smallest cross sectional areas of the separation chamber should be increased. Similarly, where a more easily separable liquid suspension is being handled, it may be desired to increase the cross sectional area of the intake chamber at the point of restriction 15, thus allowing for a greater flow of liquid out of the intake chamber.

Numerous other advantages are apparent from the foregoing description and it is obvious that changes may be made in the form, construction, and arrangement of the several parts without departing from the spirit or scope of the invention or sacrificing any of its attendant advantages; the form herein described being a preferred embodiment for the purpose of demonstrating the invention.

Having thus described this invention what is claimed as new and desired to be secured by Letters Patent is:

1. The method of separating solid material from a liquid suspension, which comprises subjecting the suspension to centrifugal force in a confining chamber whereby to deliver the solid material in said chamber in the direction of the centrifugal force while permitting the major portion of the liquid to flow in said chamber in a direction substantially opposite to the direction of the centrifugal force, releasing the solid material and the separated liquid at opposite ends of the chamber, impacting the released solid material by means of centrifugal force upon a separating screen to deliver any liquid contained therein outwardly of the screen while removing the impacted solid material from the screen inwardly thereof, and delivering the liquid separated from the solid material in the separating chamber outwardly of said screen.

2. In a device of the character described, a housing, a rotatable counter-flow, sludge receiver and distributor mounted in said housing, including means forming a plurality of radially extending separating chambers formed in said distributor, said chambers having radially inwardly facing liquid discharge openings, means on said separator for delivering sludge into said chambers at points radially outwardly of said liquid discharge openings whereby sludge may be delivered by centrifugal action, upon rotation of the separator, into said chambers for separation, the solid sludge ingredients being urged radially outwardly in said chambers by centrifugal action when the separator is rotated, and the liquid being permitted to escape radially inwardly through said inwardly facing liquid discharge openings in a direction counter to the centrifugal force exerted on the sludge when the separator is rotated, valve means at the outer ends of said chambers for releasing the separated solid sludge ingredients from said chambers, means forming an annular sieve disposed opposite the outer ends of the separating chambers in position to form an impact surface for receiving the solid sludge ingredients released through said valved delivery means at the outer ends of the chambers, and scraper means for continuously removing the solid sludge ingredient impacted thereon during the rotation of the separator.

3. In a device of the character described, a housing, a rotatable counter-flow, sludge receiver and distributor mounted in said housing, including means forming a plurality of radially extending separating chambers formed in said distributor, said chambers having radially inwardly facing liquid discharge openings, means on said separator for delivering sludge into said chambers at points radially outwardly of said liquid discharge openings whereby sludge may be delivered by centrifugal action, upon rotation of the separator, into said chambers for separation, the solid sludge ingredients being urged radially outwardly in said chambers by centrifugal action when the separator is rotated, and the liquid being permitted to escape radially inwardly through said inwardly facing liquid discharge openings in a direction counter to the centrifugal force exerted on the sludge when the separator is rotated, valve means at the outer ends of said chambers for releasing the separated solid sludge ingredients from said chambers, means forming an annular sieve disposed opposite the outer ends of the separating chambers in position to form an impact surface for receiving the solid sludge ingredients released through said valved delivery means at the outer ends of the chambers, scraper means for continuously removing the solid sludge ingredient impacted thereon during the rotation of the separator, receiver means disposed opposite said sieve for gathering the solid sludge ingredient removed from the sieve, and a liquid receiver disposed radially outwardly of the sludge receiver, and means for guiding the liquid separated from the sludge in the separating chambers as well as any liquid removed from the solid sludge ingredient during impact on the sieve to said liquid receiver.

4. A filtration device of the character described, comprising a housing, a driven shaft rotatable in said housing, chamber forming means providing a plurality of radially disposed chambers on said shaft for rotation therewith, said chamber having radially inwardly opening inlets and outwardly opening outlets, stationary delivery means disposed opposite the inlets for delivering the suspension into the apparatus, vertical annularly disposed filter means rotatable with said chamber forming means and disposed opposite said chamber outlets in position to receive material passing out of the chambers, and disposal means associated with the housing adapted to catch the clear liquid passing through the filter means and direct such liquid to a suitable disposal outlet.

5. A filtration device of the character described, comprising a housing, a driven shaft rotatable in said housing, chamber forming means providing a plurality of radially disposed chambers on said shaft for rotation therewith, said chamber having radially inwardly opening inlets and outwardly opening outlets, stationary delivery means disposed opposite the inlets for delivering the suspension into the apparatus, vertical annularly disposed filter means rotatable with said chamber forming means and disposed opposite said chamber outlets in position to receive material passing out of the chambers, disposal means associated with the housing adapted to catch the clear liquid passing through the filter means and direct such liquid to a suitable disposal outlet, and stationary scraper means operably mounted on the housing, adapted to remove solid impacted material from the inside surface of the filter medium.

6. A filtration device of the character described, comprising a housing, a driven shaft rotatable in said housing, chamber forming means providing a plurality of radially disposed chambers on said shaft for rotation therewith, said chamber having radially inwardly opening inlets and outwardly opening outlets, stationary delivery means disposed opposite the inlets for delivering the suspension into the apparatus, vertical annularly disposed filter means rotatable with said chamber forming means and disposed opposite said chamber outlets in position to receive material passing out of the chambers, disposal means associated with the housing adapted to catch the clear liquid passing through the filter means and direct such liquid to a suitable disposal outlet, stationary scraper means operably mounted on the housing, adapted to remove solid impacted material from the inside surface of the filter medium, and valve means associated with the outlet means adapted to control the delivery of material out of the chambers.

7. A filtration device of the character described, comprising a housing, a driven shaft rotatable in said housing, chamber forming means providing a plurality of radially disposed chambers on said shaft for rotation therewith, said chamber having radially inwardly opening inlets and outwardly opening outlets, stationary delivery means disposed opposite the inlets for delivering the suspension into the apparatus, vertical annularly disposed filter means rotatable with said chamber forming means and disposed opposite said chamber outlets in position to receive material passing out of the chambers, disposal means associated with the housing adapted to catch the clear liquid passing through the filter means and direct such liquid to a suitable disposal outlet, and stationary scraper means operably mounted on the housing, adapted to remove solid impacted material from the inside surface of the filter medium, said scraper means comprising a plurality of spaced apart, angularly disposed vanes, the top edge of each of said vanes positioned above the bottom edge of the next adjacent vane.

8. A filtration device of the character described, comprising a housing, a driven shaft rotatable in said housing, chamber forming means providing a plurality of radially disposed chambers on said shaft for rotation therewith, said chamber having radially inwardly opening inlets and outwardly opening outlets, stationary delivery means disposed opposite the inlets for delivering the suspension into the apparatus, vertical annularly disposed filter means rotatable with said chamber forming means and disposed opposite said chamber outlets in position to receive material passing out of the chambers, disposal means associated with the housing adapted to catch the clear liquid passing through the filter means and direct such liquid to a suitable disposal outlet, and stationary scraper means operably mounted on the housing, adapted to remove solid impacted material from the inside surface of the filter medium, said scraper means comprising a plurality of spaced apart, angularly disposed vanes, the top edge of each of said vanes positioned above the bottom edge of the next adjacent vane, said scraper assembly also being adjustable radially toward and away from the inside surface of the filtration medium whereby to allow for the removal of variable thicknesses of solid material which has been separated out.

9. In a device of the character described, a housing, a driven shaft rotatable in said housing, means forming a plurality of intake chambers radially disposed about said driven shaft and adapted for rotation therewith, a separation chamber associated with each intake chamber and extending radially away from said intake chamber, said separation chambers being also adapted to move with the intake chambers, a portion of each said separation chamber overlying a portion of its corresponding intake chamber, each intake chamber having a delivery mouth opening into its corresponding separation chamber, each separation chamber having a liquid delivery opening facing radially inwardly of the point at which the delivery mouth of the corresponding intake chamber is located, each separation chamber also having an outlet orifice located at a point radially outwardly from the point at which the delivery mouth of the intake chamber is located, means associated with the liquid delivery openings of the separation chamber for removing fluid therefrom and delivering the fluid to a suitable disposal outlet, discharge means at the orifices of the separation chambers for discharging material out of the orifice of the separation chamber, and filtration means positioned with respect to the discharge means so as to receive the material discharged from said discharge means.

10. In a device of the character described, a housing, a driven shaft rotatable in said housing, means forming a plurality of intake chambers radially disposed about said driven shaft and adapted for rotation therewith, a separation chamber associated with each intake chamber and extending radially away from said intake chamber, said separation chambers being also adapted to move with the intake chambers, a portion of each said separation chamber overlying a portion of its corresponding intake chamber, each intake chamber having a delivery mouth opening into its corresponding separation chamber, each separation chamber having a liquid delivery opening facing radially inwardly of the point at which the delivery mouth of the corresponding intake chamber is located, each separation chamber also having an outlet orifice located at a point radially outwardly from the point at which the delivery mouth of the intake chamber is located, means associated with the liquid delivery openings of the separation chamber for removing fluid therefrom and delivering the fluid to a suitable disposal outlet, discharge means at the orifices of the separation chambers for discharging material out of the orifice of the separation chamber, filtration means positioned with respect to the discharge means so as to receive the material discharged from said discharge means, and means for applying a separation-producing force to the material discharged upon the surface of the filter medium whereby to cause the liquid portions of said material to pass through the body of the filter medium while the solid portions thereof are retainer upon the surface of the filter medium.

11. In a device of the character described, a housing, a driven shaft rotatable in said housing, means forming a plurality of intake chambers radially disposed about said driven shaft and adapted for rotation therewith, a separation chamber associated with each intake chamber and extending radially away from said intake chamber, said separation chambers being also adapted to move with the intake chambers, a portion of each said separation chamber overlying a portion of its corresponding intake chamber, each intake chamber having a delivery mouth opening into its corresponding separation chamber, each separation chamber having a liquid delivery opening facing radially inwardly of the point at which the delivery mouth of the corresponding intake chamber is located, each separation chamber also having an outlet orifice located at a point radially outwardly from the point at which the delivery mouth of the intake chamber is located, means associated with the liquid delivery openings of the separation chamber for removing fluid therefrom and delivering the fluid to a suitable disposal outlet, discharge means at the orifices of the separation chambers for discharging material out of the orifice of the separation chamber, filtration means positioned with respect to the discharge means so as to receive the material discharged from said discharge means, means for applying a separation-producing force to the material discharged upon the surface of the filter medium whereby to cause the liquid portions of said material to pass through the body of the filter medium while the solid portions thereof are retained upon the surface of the filter medium, and means for continuously removing a predetermined portion of the solid materials left upon the surface of the filter medium.

JOSEPH HARRINGTON.